March 16, 1954  E. E. FARRELL  2,672,308
AIRCRAFT WHEEL PREROTATING DEVICE
Filed June 19, 1952
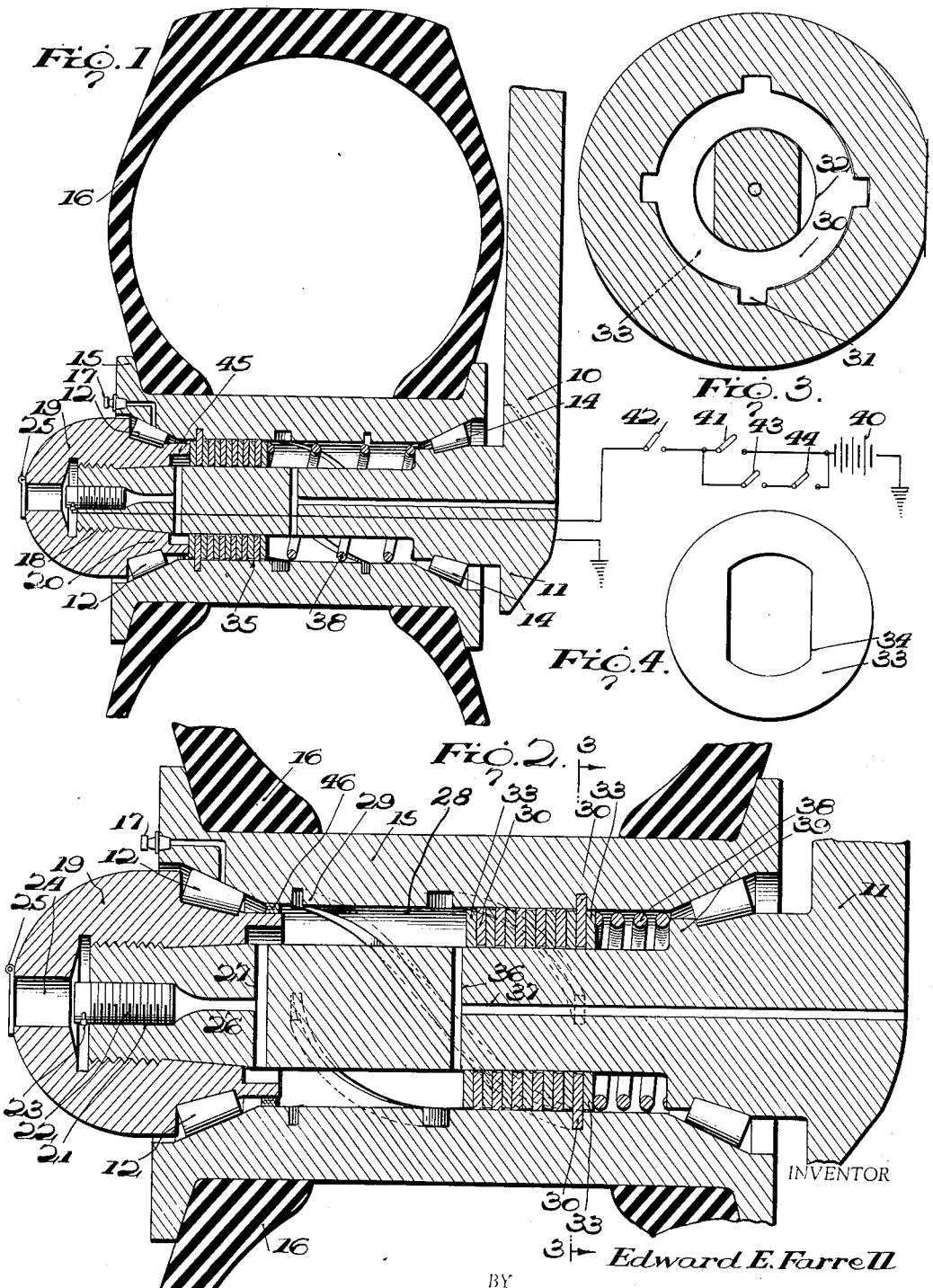
INVENTOR
Edward E. Farrell
BY
Adams, Forward & McLean
ATTORNEYS Patented Mar. 16, 1954

2,672,308

UNITED STATES PATENT OFFICE 2,672,308

AIRCRAFT WHEEL PREROTATING DEVICE

Edward E. Farrell, Islip, N. Y.

Application June 19, 1952, Serial No. 294,505

4 Claims. (Cl. 244—103)

This invention relates to a mechanism for imparting high-sped rotational movement to a heavy mechanism, such as an aircraft wheel, in a very short period of time. More particularly, this invention relates to a device for the prerotation of an aircraft wheel just prior to contact of the wheel with the ground.

As is well-known, the problem of imparting motion instantaneously to a heavy mass such as an aircraft wheel requires a tremendous force to overcome the inertia as well as to accelerate the rotation of the wheel to the desired high speed within a very limited period of time measured in the order of a few seconds. Starting the wheel rotation a considerable period before contact of the wheel with the ground has caused a very undersirable gyroscopic effect which noticeably interferes with the normal flight of the airplane as well as considerably increasing the problems involved in landing an aircraft. It is important to avoid the use of extraneous equipment jutting out into the air stream and to avoid the addition of any excessive weight increment to the aircraft. The prerotating device must not interfere with the operation of the wheels after landing, during taxiing, in the use of the brakes, or in the backing and turning maneuvers necessary in the handling of aircraft on the ground by hangar crews.

My invention provides a device capable of meeting the above requirements. The mechanism involved is rugged and requires few moving parts. It is possible to alter the present landing gear equipment in a manner such that my invention may be used.

My invention further provides a mechanism for the prerotation of a wheel which has an inherent power capable of developing extremely high rotational forces. In aircraft design this means that the size and weight of the aircraft wheel as well as the strut assembly may be considerably reduced. For some time, attempts have been made to reduce the size of this structure but such a change has been limited by the fact that the smaller the wheel, the faster is its required rotation on the landing run. To my knowledge no device prior to my invention was capable of instantaneously and efficiently providing the required high power. Even in small aircraft such as combat fighters, where the weight increment is extremely critical, it might be desirable to include my invention as a safety feature for landing on soft fields or on steel matting fields.

My invention comprises a drive mechanism having a spindle, a wheel hub rotatably mounted on said spindle, and a drive means having an explosive-type power means combined with the spindle and the wheel hub. Mounted on the spindle is a bundle of washers, this bundle including alternately positioned clutch washers and drive washers. The clutch washers are mounted for translational movement only on the spindle; the drive washers are mounted for both translational and rotational movement on the spindle. The inner cylindrical wall of the wheel hub has spiral grooves therein into which extend driving lugs of the driving washers. In the stand-by condition the washers are positioned at the outer end of the spindle.

An explosive-type power means is provided for instantaneously increasing the frictional engagement of the clutch means with the drive means sufficiently to prevent rotation of the drive means and for rapidly moving the drive means and clutch means to the inner end of the spindle to accomplish instantaneous spinning of the wheel. This explosive-type power means includes gas inlet and exhaust means and the necessary firing system. A cartridge of explosive powder is positioned in a cap at the outer end of the spindle and upon ignition high pressure gases flow through the spindle and into the expansion chamber formed by the inner cylindrical wall of the hub and exert a pressure on the outermost clutch washer in cooperation with a resilient resistance means positioned at the opposite end of the spindle. The resulting tremendous force causes the alternately positioned clutch washers to frictionally grip the drive washers when resisted by the resilient means and force them along the spindle to the inner end thereof without allowing rotational movement of the drive washers. This results in an instantaneous and very rapid rotation of the wheel hub. The loosely packed bundle of washers is transformed into a piston-like tightly packed bundle of washers when acted on by the high pressure gases on one side and the resistance of the return spring on the other. When this piston or tightly packed bundle of washers reaches the inner end of the spindle, suitable exhaust ports provide for the release of the high pressure gases and the wheel hub rotates freely. This is an automatic declutching feature of the instant invention.

An electrical firing circuit will be described hereinafter which may be manually operated by the pilot an instant before the wheels touch the ground or which may be automatically operated by a feeler rod extending a predetermined distance below the wheel.

To provide for the positive return of the bundle of washers to the outer end of the spindle, a resilient means, advantageously the above noted resistance means, is provided which engages the innermost clutch washer and biases the bundle outwardly along the spindle.

The mechanism shown in the drawing is made up of a small number of parts. The spindle, the cap, and the wheel hub are used on all present landing gears. These parts are modified and the spring, the bundle of washers, and the cartridge are added. It will be readily appreciated that this is a rather inexpensive modification resulting in a very efficient preacceleration device. Close tolerances must be held in the firing chamber and in the seal between the cap and the wheel hub to insure proper power transmission. Due to the large amount of gases released from the cartridge and the instantaneous action of the mechanism, any small amount of leakage through the washers or the spiral grooves does not affect the operation of the mechanism. Maintenance on the device is negligible due to its simplicity and few moving parts.

Other objects and advantages of my invention will be apparent from the following description when considered in connection with the accompanying drawing wherein:

Fig. 1 is a sectional view of a landing wheel and strut embodying the invention, parts being shown in elevation and with the mechanism in stand-by position;

Fig. 2 is an enlarged sectional view similar to Fig. 1, showing the mechanism in an extended position;

Fig. 3 is a sectional view taken on line 3—3 of Fig. 2 showing a drive washer; and Fig. 4 is a view of a clutch washer.

As shown in Fig. 1, my invention includes a landing wheel strut 10 to which is rigidly connected a spindle 11. Through suitable roller bearings 12 and 14 a wheel hub 15 is mounted on the spindle 11 and a rubber tire 16 is mounted on the wheel hub in the usual manner. Suitable grease fittings, such as fitting 17, are provided for the purpose of lubrication of the bearings. The outer end of the spindle 11 is appropriately threaded at 18 to receive a cap member 19, this cap member being tapered on its inner end 20 to support and position the roller bearings 12.

The above described structure is somewhat similar to the structure now used in landing gears for airplanes. My invention involves a modification of this structure and the addition of other elements. As will be seen more clearly in Fig. 2, the spindle 11 is hollowed at its outer end to provide a cylinder 21 for the reception of a cartridge 22 which is filled with an explosive substance such as propellant or rocket powder. Each cartridge 22 is provided with a suitable squib 23 for igniting the charge upon receipt of an electrical impulse. The cartridge 22 is preferably threaded into the outer end of the spindle 11 and the cap member 19 is provided with an access opening 24 for removal and replacement of the cartridge. A suitable cover 25 is provided for the access opening 24 in the cap member 19.

Explosive gases from the cartridge 22 travel through a central channel 26 into a plurality of radially disposed channels 27 and then into the cylinder 28 formed by the inner cylindrical wall of the wheel hub 15. An inner annular ring 45 extends from the cap 19 for abutment by the outer clutch washer 33 to provide a gas chamber for the flow of the high pressure gas to the surface of the clutch washer.

As seen in Fig. 2, the wheel hub 15 has spiral grooves 29 formed in its inner cylindrical wall. Drive washers 30 which are mounted on the spindle 11 (Figs. 2 and 3) have lugs 31 which extend into the spiral grooves 29. The holes 32 in the drive washers 30 are circular to allow translational and rotational movement on the spindle 11. On either side of these drive washers 30 is positioned a clutch washer 33 which has an oblong hole 34 therein (Fig. 4) to restrict its movement on the spindle 11 to translational movement, the spindle 11 being oblong in cross-section. The outer periphery of the clutch washer 33 is circular and slidably engages the wall of the cylinder 28.

The alternate positioning of the clutch washers 33 and drive washers 30 forms a loosely packed bundle 35 which causes no interference with the normal wheel rotation when the mechanism is in the stand-by position, but upon the application of high pressure to the outer clutch washer 33 the bundle 35 becomes tightly packed and performs like a piston when resisted by the action of the extended return spring 38 whose tension is overcome by the power of the expanding gases. A seal 46 is provided between the cap 19 and the wheel hub 15 to prevent leakage of the high pressure gas. The high force created by the high pressure gases causes the clutch washers 33 to engage the drive washers 30 and prevent rotational movement of the drive washers 30. The clutch washers 33 are pressed against the drive washers 30 with such tremendous force that the frictional forces created thereby are sufficient to prevent rotation of the drive washers. The drive and clutch washers may be of two different materials to provide proper friction and bearing properties. Under the force of the high pressure gas the wheel hub is caused to rotate instantaneously through the drive washers 30 as the piston travels from the outer end of the spindle to the inner end of the spindle. The movement of the piston is extremely rapid and causes an immediate spinning of the wheel. It will be understood that the quantity of powder employed in the cartridge will be chosen with regard to the moment of inertia of the wheel, to the landing speed of the aircraft, and to other factors involving considerations of mere design. When the piston reaches the inner end of the spindle 11, the gases produced by the explosive-type power means are immediately discharged through a plurality of radial exhaust ports 36 and then through the main exhaust conduit 37 formed in the spindle. This instantaneous exhaust of the high pressure gas accomplishes an immediate and automatic declutching of the drive mechanism because the clutch and drive washers change from a tightly packed piston to a loosely packed bundle at this instant. Therefore, when the wheel of the airplane touches the ground, the drive mechanism is completely declutched and the drive washers 30 are free to rotate with the wheel.

To return the bundle 35 of washers to the outer end of the spindle, I have provided a resilient means or spring 38 which has one end seated on the inner portion 39 of the spindle and the other end engaging the inner clutch washer 33. The spring 38 biases the bundle 35 of washers toward the outer end of the spindle 11, and, it will be understood, causes the bundle of washers to move back to the outer end of the spindle after the wheel driving operation.

The squib 23 is of the single wire type, being grounded to the case of the cartridge 22 and connected to a firing circuit shown in Fig. 1. A suitable battery or electrical source 40 is provided, and the circuit therefrom includes a pilot controlled switch 41 located on the pilot's control panel to allow energizing of the circuit upon landing. To avoid energization of the circuit when the wheels are not in the fully lowered position, a safety switch 42 may be provided on the wheel lowering mechanism. To enable automatic energization of the firing circuit when the wheels are a predetermined distance from the ground, a switching circuit in parallel with the pilot controlled switch 41 may be provided. Prior to landing, the pilot will open switch 41 and close switch 43 and when the plane reaches the predetermined distance from the ground, a wheel switch 44 can be tripped by means of a suitable feeler rod extending below the tire for engagement with the ground.

It will be readily understood that it would be possible to make provision for several cartridges to be fired, one on each landing or all at one time if increased power is required. These cartridges would be easily replaceable. The cap 19 is connected to the spindle 11 in a manner which facilitates removal, thereby allowing complete removal of the wheel assembly for service or maintenance.

I claim:

1. In a drive mechanism for rotating a wheel, a spindle, a wheel hub rotatably mounted on said spindle, an inner cylindrical wall in said wheel hub defining a chamber about said spindle, a spiral groove in said cylindrical wall, drive means for said wheel hub positioned in said chamber slidably and rotatably mounted on said spindle, engaging means affixed to said drive means projecting into said spiral groove in sliding engagement therewith, clutch means positioned in said chamber adjacent and frictionally engaging said drive means and mounted on said spindle in non-rotational transverse sliding engagement therewith, resilient resistant means within said chamber biasing said clutch and drive means to a position at one end of said spindle holding said engaging clutch and drive means in abutting loose frictional engagement permitting relative rotational movement between said clutch and drive means, and power means connected to said chamber for explosively introducing gas into said chamber at the side of said clutch and drive means opposing the bias of said resilient resistant means, whereby operation of said power means substantially instantaneously increases the frictional engagement between said clutch means and said drive means to prevent relative rotation between said drive means and said clutch means and rapidly moves said drive means and said clutch means to the other end of said spindle against the biasing of said resilient means to accomplish substantially instant spinning of said wheel hub.

2. In a drive mechanism for rotating a wheel, a spindle, a wheel hub rotatably mounted on said spindle, an inner cylindrical wall in said wheel hub defining a chamber about said spindle, a spiral groove in said cylindrical wall, drive means for said wheel hub positioned in said chamber slidably and rotatably mounted on said spindle, engaging means affixed to said drive means projecting into said spiral groove in sliding engagement therewith, clutch means positioned in said chamber adjacent and frictionally engaging said drive means and mounted on said spindle in non-rotational transverse sliding engagement therewith, resilient resistant means within said chamber biasing said clutch and drive means to a position at one end of said spindle holding said engaging clutch and drive means in abutting loose frictional engagement permitting relative rotational movement between said clutch and drive means, power means connected to said chamber for explosively introducing gas into said chamber at the side of said clutch and drive means opposing the bias of said resilient resistant means, whereby operation of said power means substantially instantaneously increases the frictional engagement between said clutch means and said drive means to prevent relative rotation between said drive means and said clutch means and rapidly moves said drive means and said clutch means to the other end of said spindle against the biasing of said resilient means to accomplish substantially instant spinning of said wheel hub, and an exhaust means from said chamber positioned to discharge the high pressure gas when said clutch means and said drive means have been moved to said other end of said spindle under operation of said power means, whereby discharge of gas accomplishes instantaneous declutching at the end of the drive stroke.

3. In a drive mechanism for rotating a wheel, a spindle, a wheel hub rotatably mounted on said spindle, an inner cylindrical wall in said wheel hub defining a chamber about said spindle, a spiral groove in said cylindrical wall, a bundle of washers positioned within said chamber and mounted on said spindle, said bundle including alternately mounted clutch washers in non-rotational transverse sliding engagement with said spindle and drive washers slidably and rotatably mounted on said spindle, engaging means affixed to each of said drive washers projecting into said spiral groove in sliding engagement therewith, resilient resistant means within said chamber biasing said bundle of washers to a position at one end of said spindle holding said washers in abutting loose frictional engagement permitting relative rotational movement therebetween, and power means connected to said chamber for explosively introducing gas into said chamber at the side of said bundle of washers opposing the bias of said resilient resistant means, whereby operation of said power means substantially instataneously increases the frictional engagement between said washers to prevent relative rotation therebetween and to form a piston of the bundle of washers and rapidly moves said piston to the other end of said spindle against the biasing of said resilient means to accomplish substantially instant spinning of said wheel hub.

4. In a drive mechanism for rotating a wheel, a spindle, a wheel hub rotatably mounted on said spindle, an inner cylindrical wall in said wheel hub defining a chamber about said spindle, a spiral groove in said cylindrical wall, a bundle of washers positioned within said chamber and mounted on said spindle, said bundle including alternately mounted clutch washers in non-rotational transverse sliding engagement with said spindle and drive washers slidably and rotatably mounted on said spindle, engaging means affixed to each of said drive washers projecting into said spiral groove in sliding engagement therewith, resilient resistant means within said chamber biasing said bundle of washers to a position at one end of said spindle holding said washers in abutting loose frictional engagement permitting relative rotational movement therebetween, power means connected to said chamber for explosively introducing gas into said chamber at the side of said bundle of washers opposing the bias of said resilient resistant means, whereby operation of said power means substantially instantaneously increases the frictional engagement between said washers to prevent relative rotation therebetween and to form a piston of the bundle of washers and rapidly moves said piston to the other end of said spindle against the biasing of said resilient means to accomplish substantially instant spinning of said wheel hub, and an exhaust outlet from said chamber positioned to discharge the high pressure gas when said piston has been moved to said other end of said spindle under operation of said power means, whereby discharge of gas accomplishes instantaneous declutching at the end of the drive stroke.

EDWARD E. FARRELL.

References Cited in the file of this patent

UNITED STATES PATENTS

| Number | Name | Date |
|---|---|---|
| 1,104,087 | Van Riper | July 21, 1914 |
| 1,828,965 | Fuller | Oct. 27, 1931 |
| 2,425,583 | Volk | Aug. 12, 1947 |
| 2,461,288 | Livermon | Feb. 8, 1949 |
| 2,477,907 | Smith | Aug. 2, 1949 |
| 2,580,381 | Banker | Jan. 1, 1952 |

FOREIGN PATENTS

| Number | Country | Date |
|---|---|---|
| 730,941 | France | Aug. 26, 1932 |